(12) United States Patent
Nitsche et al.

(10) Patent No.: US 7,100,749 B2
(45) Date of Patent: Sep. 5, 2006

(54) OPERATING MATERIAL SUPPLY DEVICE

(75) Inventors: Martin Nitsche, Gerstetten (DE); Martin Becke, Ulm (DE)

(73) Assignee: Voith Turbo GmbH & Co. KG, (DE)

( * ) Notice: Subject to any disclaimer, the term of this patent is extended or adjusted under 35 U.S.C. 154(b) by 0 days.

(21) Appl. No.: 10/398,135

(22) PCT Filed: Sep. 13, 2001

(86) PCT No.: PCT/EP01/10567

§ 371 (c)(1),
(2), (4) Date: Jul. 8, 2003

(87) PCT Pub. No.: WO02/24500

PCT Pub. Date: Mar. 28, 2002

(65) Prior Publication Data
US 2004/0011611 A1   Jan. 22, 2004

(30) Foreign Application Priority Data
Sep. 20, 2000  (DE) ............................... 100 46 827

(51) Int. Cl.
*F16D 57/02* (2006.01)
(52) U.S. Cl. .................................................. 188/296
(58) Field of Classification Search ............... 188/295, 188/296, 290, 292, 293
See application file for complete search history.

(56) References Cited

U.S. PATENT DOCUMENTS

| | | | | |
|---|---|---|---|---|
| 3,774,735 A | * | 11/1973 | Hanke et al. | 188/296 |
| 3,941,224 A | | 3/1976 | Hanke | |
| 4,321,990 A | * | 3/1982 | Koch, Jr. | 188/296 |
| 4,432,442 A | | 2/1984 | Vogelsang | |
| 4,896,634 A | * | 1/1990 | Kronich | 123/90.34 |
| 5,178,238 A | * | 1/1993 | Schaeff | 188/295 |
| 5,261,797 A | * | 11/1993 | Christenson | 417/380 |

FOREIGN PATENT DOCUMENTS

| | | |
|---|---|---|
| DE | 44 38 913 A1 | 12/1995 |
| EP | 0428311 | 5/1991 |
| JP | 05170088 | 7/1993 |

* cited by examiner

*Primary Examiner*—Melanie Torres
(74) *Attorney, Agent, or Firm*—Ostrolenk, Faber, Gerb & Soffen, LLP

(57) ABSTRACT

The invention relates to an operating material supply device for hydrodynamic components, for example, hydrodynamic switching elements for use in starting units, retarder assemblies or gearing assemblies. The material supply device includes an operating material reservoir arranged in the housing of the starting unit, retarder unit, or gearing assembly and comprises an operating material sump with at least one filling line that connects the operating material sump to the hydrodynamic component. The operating material sump may be closed in a pressure-tight manner.

12 Claims, 3 Drawing Sheets

OPERATING MATERIAL SUPPLY DEVICE

FIELD OF THE INVENTION

The invention relates to an operating material supply device for switchable elements, for example, hydrodynamic components in starting units, retarder units or gearing assemblies.

BACKGROUND INFORMATION

Hydrodynamic components for use in starting units, retarder units or gearing assemblies may be switchable, and these components may be filled and emptied. Rapid chilling may be required. For example, when hydrodynamic constructional units form hydrodynamic retarders, very short filling times may be required for safety to achieve a rapid braking action or a regulated torque profile that, for example, may cause a certain speed profile when starting an engine. According to general designs known in the prior art, the filling occurs with the aid of operating material reservoir devices, which use external auxiliary power from the vehicle or from their own force to accelerate the filling process when hydrodynamic elements are being filled. In this case, piston-type reservoirs, which are actuated by spring force or compressed air from the compressed air system of the vehicle, may be used. The entire housing space may be set under pressure, which causes operating material to exit the oil sump into the corresponding, hydrodynamic component. Corresponding pump devices may also be employed to aid filling.

However, it is believed that the designs according to the prior art disadvantageously consume power with respect to the conversion and presupposing of special equipment.

SUMMARY OF THE INVENTION

It is an object of the present invention to provide an operating material supply device for switchable elements of starting units, retarder units, or gearing assemblies that avoids the disadvantages of the prior art described above. For example, an exemplary embodiment of the present invention permits short filling times. If compressed air is used as the pressure medium, the consumption of air is effective and kept as small as possible. Furthermore, an exemplary operating material supply device according to the present invention is not impaired in function, even in the case of repeated, rapidly successive actuations. The structural outlay and cost expenditure is kept low.

Another exemplary operating material supply device according to the present invention for switchable elements, for example, hydrodynamic components in starting units and gearing assemblies, includes an operating material reservoir having an operating material sump arranged in the housing of the corresponding, switchable element or of the overriding starting, retarder or gearing assembly. The operating material sump is connected to the switchable element, for example, the hydrodynamic component, via at least one filling line. According to an exemplary embodiment of the present invention, the operating material sump may be closed in a pressure-tight manner with respect to the remaining part of the operating material reservoir or the housing of the switchable element, for example, the hydrodynamic component or an overriding starting unit, retarder unit or gearing assembly. For this purpose, a corresponding arrangement may provide the pressure-tight closure of the operating material sump with respect to the surroundings or the housing interior. To cause a rapid filling operation, an arrangement may be provided for charging the operating material in the operating material sump with an influencing pressure.

An exemplary embodiment of the present invention advantageously permits simple filling via a pressure medium, and the geometrical shape and dimensions of the operating material sump may be freely configured to adapt to available structural space. Reservoir volumes may be advantageously kept large, and little pressure medium may be consumed, since only the operating material volume of the operating material sump is sealed, while the remaining portions of the operating material reservoir remain vented. Sequential switching operations are not impaired, since oil that flows out of the hydrodynamic elements when switching off occurs is returned directly into the sump. In this case, the operating material sump receives operating material flowing back from switching elements and from hydrodynamic components.

The arrangement to provide the pressure tight seal and the arrangement to charge the operating material sump with an influencing pressure may be configured in a variety of ways. To cause rapid filling, the arrangement to provide the pressure tight seal and the arrangement to charge the operating material sump may be functionally coupled to each other. Furthermore, these arrangements may be structurally coupled to each other, and individual components may be part of both arrangements.

The arrangement to provide the pressure-tight closure of the operating material sump with respect to the surroundings or the housing interior includes at least one control valve having at least one valve element that interacts with a valve seat. The valve seat is formed by the element forming the opening. The arrangement also includes a movable piston element coupled to the valve element. The control valve is coupled to an actuating device for actuating the valve element. The actuating device connects a pressure connection to the pressure chamber. The arrangement for producing an influencing pressure also includes a valve device which, when charged via an actuating device, connects a pressure medium connection or a connection to the atmosphere to the operating material sump. According to an exemplary compact design of the present invention, the control valve of the arrangement for providing the pressure-tight closure and the valve device for coupling the atmosphere or a pressure medium connection to the operating material sump are combined in a combined valve device. Furthermore, the actuating device for the control valve and the valve device is formed by an actuating device jointly assigned to both. The combined valve device comprises at least one pressure space, in which the valve element of the control valve and the valve element of the second valve device of the arrangement for charging with pressure are arranged and displaceably mounted, and a connection to the atmosphere or to a pressure medium source and a further, second connection to the operating material sump. The valve elements of the valve device of the charging arrangement and of the control valve are kept in a prestressed position in an unpressurized state by spring devices. The dimensions of the spring devices and of the charging surfaces of the piston elements forming the valve elements permit the closure of the operating material sump and the filling to be functionally coupled, without additional control measures.

The solution may also be coupled to a closed, pressure-tight circuit assigned to the hydrodynamic component.

There are no restrictions with regard to the sphere of use. Uses both in the vehicle and in stationary systems are possible.

BRIEF DESCRIPTION OF THE DRAWINGS

The solution according to the invention will be explained below with reference to figures, in which the following is illustrated specifically.

DETAILED DESCRIPTION

Figure 1:
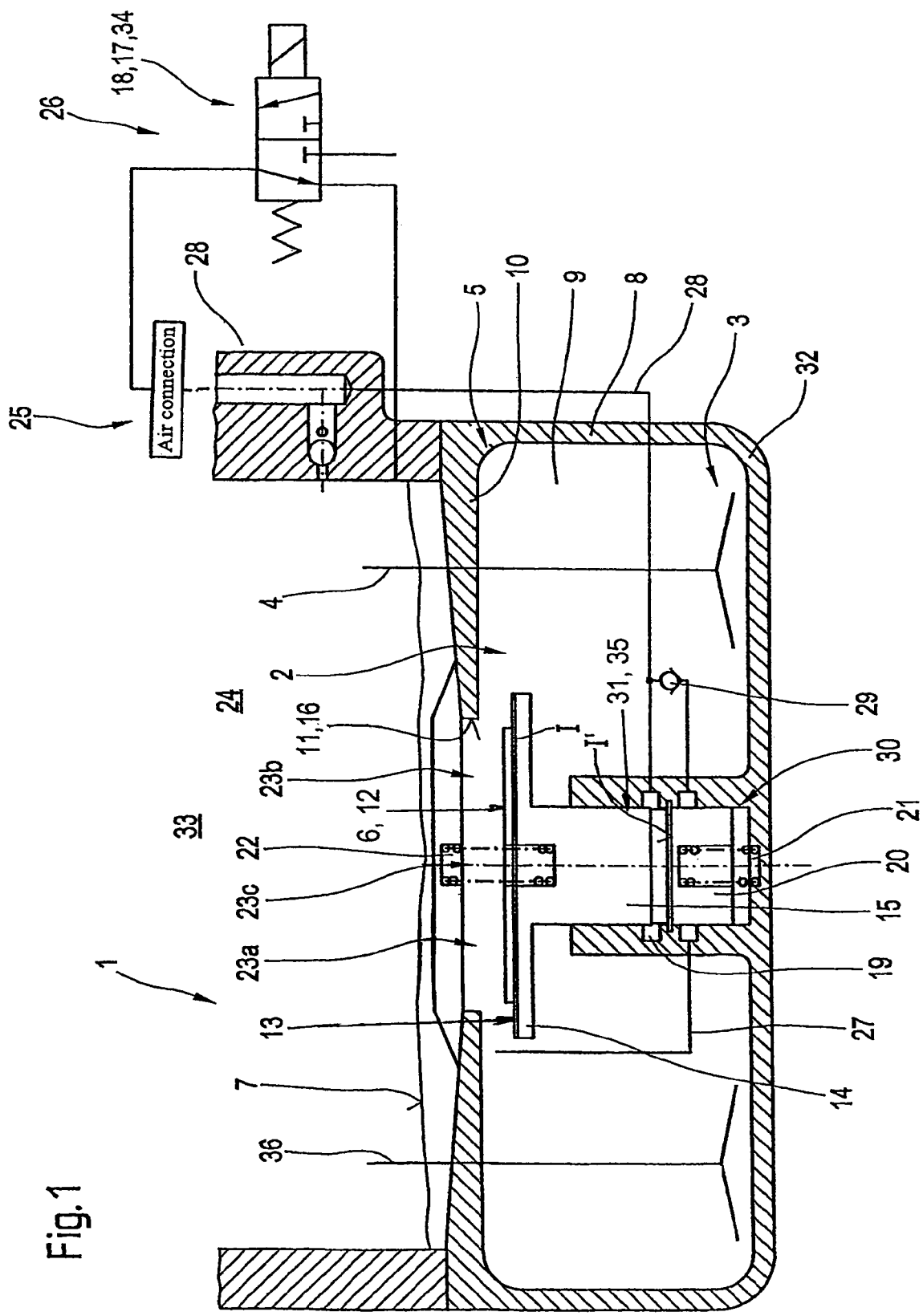
FIG. 1 illustrates an operating material supply device in an unpressurized state according to the present invention.

FIG. 1 illustrates an operating material supply device 1 according to the present invention for switchable elements in starting, retarder and/or gearing assemblies. The switchable elements may be hydrodynamic components that form hydrodynamic clutches, hydrodynamic brakes or hydrodynamic speed/torque converters. The operating material supply device 1 includes an operating material reservoir 2 having an operating material sump 3. The operating material sump is coupled to the switchable element, for example, to a working space of a hydrodynamic component, via at least one filling line 4. Furthermore, a suction line 36 of an oil supply pump is provided. The operating material reservoir 2 is arranged in a housing of the switching element, of the starting unit, retarder unit or of the gearing assembly. The operating material reservoir 2 includes a housing 5, which may be formed by the housing 32 of the switchable element, of the starting unit or retarder unit or of the gearing unit. In an exemplary compact embodiment of the present invention, the housing 5 of the operating material reservoir 2 is formed by the housing of the hydrodynamic component when the operating material supply device 1 is assigned to a hydrodynamic component. According to an exemplary embodiment of the present invention, the operating material sump 3 is closeable via an arrangement 6 for providing the pressure-tight closure of the operating material sump with respect to the surroundings or the housing interior 33, in which the operating material reservoir 2 is situated. The operating material sump 3 and the operating material reservoir unit 2 are arranged with respect to the switchable element so that the switchable element is arranged below the operating material level 7 (e.g., below the oil level in the operating material reservoir 2). The operating material sump 3 is enclosed by a housing wall region 8, which lies below the operating material level 7 usually present in the switchable element or the housing 32 of the switchable element or its overriding unit. The housing wall region 8 forms a chamber 9, which may be filled with operating material. The chamber 9 includes at least one opening 11 in an upper region on the upper boundary wall 10 in the installed position. The arrangement 6 to provide the pressure-tight closure of the operating material sump 3 with respect to the surroundings or the rest of the housing interior of the operating material reservoir 2 or, when this housing 5 is formed from the housing of the switchable element or of the gearing assembly or of a starting element, with respect to the housing interior 33 thereof includes a device 12 to close the opening 11. Device 12 includes a control valve 13, the valve element 14 of which is formed by a movable piston element 15 that enters into operative connection with a valve seat 16 formed by opening 11. For this purpose, the valve element 14 may be charged with a pressure medium, for example, via an actuating element 17 for actuating the valve element 14, for example, in the form of a valve device 18, which controls the supply of pressure medium to the valve element 14. In the case illustrated, the movable piston element 15 is guided in a pressure chamber 19, which may be charged with pressure medium. To carry out the filling as rapidly as possible, arrangement 26 is provided to produce an influencing pressure on the operating material situated in the operating material sump 3. Arrangement 26 includes a valve device 30 for coupling the atmosphere 25 (or a pressure medium connection in the form of a pressure medium source 28) to the operating material in the operating material sump 3. This valve device 30 is also assigned an actuating device 34. In the case illustrated, the valve device 30 includes a further piston element 20 arranged in the pressure chamber 19. The valve device forms a valve element and is prestressed by spring device 21. The spring force of the spring device 21 counters to the pressure force in the pressure chamber 19 when being charged with pressure. With respect to the exemplary compact embodiment illustrated, arrangement 6 and the arrangement 26 are functionally and structurally coupled to one another. Individual components of both systems may be used (e.g., the valve device 18 may be used as actuating device 17 and 34 and also the common pressure space 19 and the coupling to the atmosphere 25). Valve devices 30 and 13 may be combined to form a structural unit 35.

Figure 2:
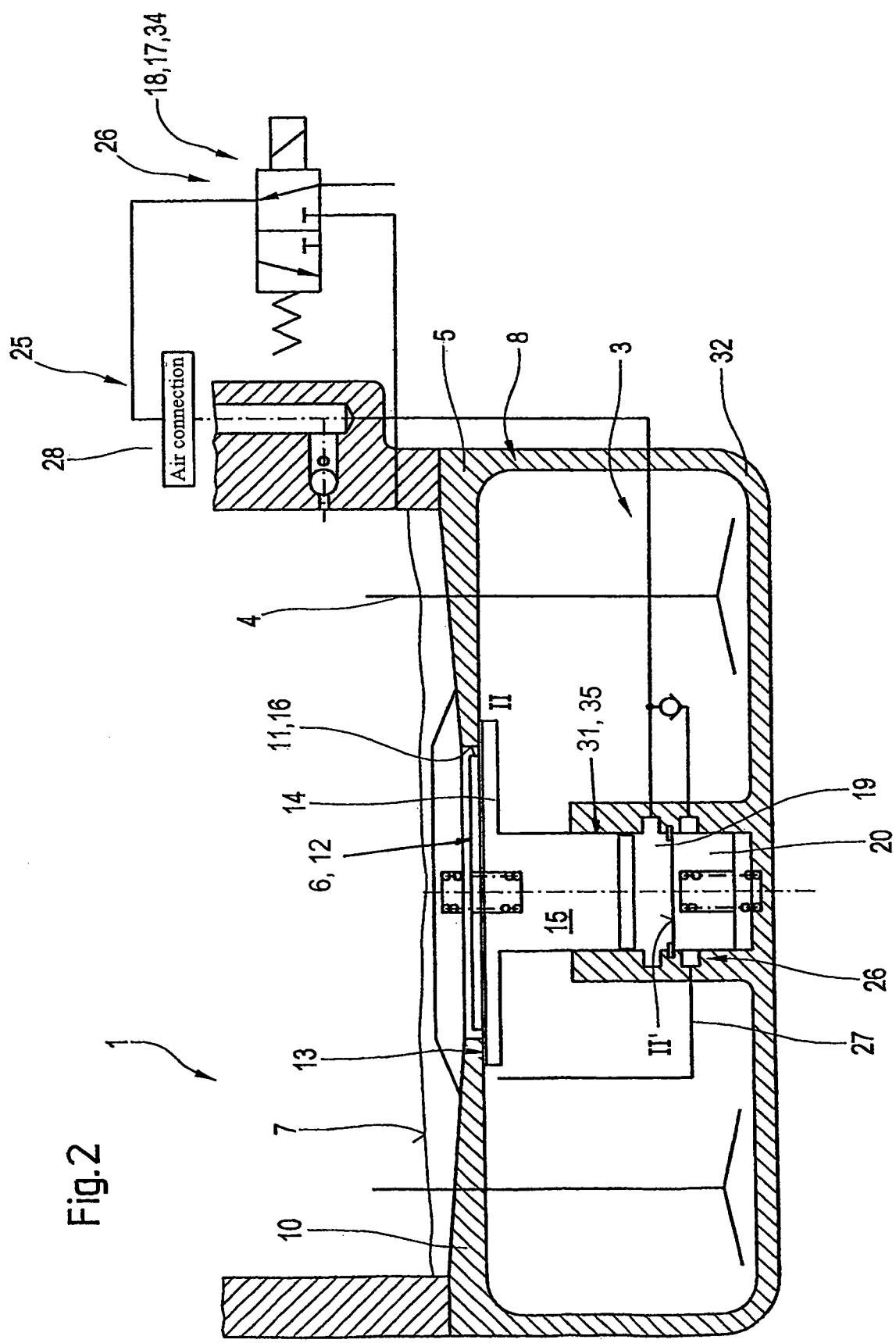
FIG. 2 illustrates an operating material supply device according to the present invention during the closing of the operating material sump.

The movable piston element 15 may be assigned a spring device 22, which counters the movement of the piston element 15. In the unpressurized state of the system, as illustrated in FIG. 1, the spring device 22 is relieved of load. In this state, the device 12 for the closure of the opening 11, i.e., the control valve 13, is in the opened state. The valve element 14 does not interact with the valve seat 16. Operating material may overflow from the region of the operating material reservoir 2 above the operating material sump 3, for example, the possibility of leakage oil flowing in, the inflow direction of which is indicated by 23a, of operating material flowing back from the hydrodynamic element, the flow direction of which is referred to by 23b, and of the overflow of directly returned operating material according to 23c from that region 24 of the operating material reservoir 2 which is situated outside the closeable operating material sump and is also partially filled with operating material. The two pistons (i.e., the piston elements 15 and 20 of the valve devices 13 and 30 combined to form the structural unit 35 as combined valve device 31) are relieved of load, i.e., in an unpressurized state. In this state, the pressure medium connection 28 (e.g., an air connection) is decoupled from the pressure chamber 19. The control valve 13 is situated in its first functional position I. In a similar manner, the valve device 30 is situated in functional position I'. The final functional position II of the valve element 14 and II' of the valve element 20 are illustrated in FIG. 2. The position of valve element 20 is to be taken up when the opening 11 is closed. With reference thereto, the function of the closeable operating material sump 3 during the closing process is depicted schematically. The basic construction of the operating material supply device 1 corresponds to that described in FIG. 1. As such, the same reference numbers are used for identical elements. The functional position II of the valve element 14 of the control valve 13 illustrated in FIG. 2 differs with respect to the functional position I in FIG. 1.

To close the operating material sump 3, the control valve 13 (e.g., the movable piston element 15) is charged with pressure. This pressure is supplied via the valve device 18 in the pressure chamber 19. In this case, compressed air supplied to the pressure space 19 via the valve device 18 when leaving the pressurized state displaces the piston element 15 to close the control valve 13 by interaction with the valve seat 16. During closure of the opening 11, leakage losses during operation are blocked, the return movements of the individual elements, either the return movements directly of the switching elements. Furthermore, to fill the switching elements, the switching elements should be supplied with operating material from the operating material sump 3. This occurs via the filling line 4, and arrangement 26 is provided for producing an influencing pressure on the operating material in the operating material sump 3, so that the filling operation may occur as rapidly as possible. After closure of the opening 11, the operating material sump 3 is pressure-tight with respect to the remaining region 24 of the operating material reservoir 2 or of the corresponding housing, which forms the housing 5 of the operating material reservoir. The arrangement 26 includes a pressure line 27 extending into the operating material sump 3. The arrangement 26 may be coupled to a pressure medium source 28, for example, the atmosphere. In the case illustrated, the arrangement 26 for producing an influencing pressure and the pressure-tight closure of the operating material sump 3 may be formed as a unit. The valve device 18, which acts as an actuating device 17, actuates the valve device 30 to charge the pressure chamber 19 and cause a movement of the piston element 15. The valve device may actuate the second piston element 20 of the valve device 30. The second piston element 20 permits or blocks a coupling between the pressure medium connection and the operating material sump to couple a pressure medium source 28 or the atmosphere to the operating material sump 3.

In FIG. 2, the piston element 20 has a functional position II'. In this position, the pressure medium connection 28 leads into the pressure chamber 19 and the transfer of the pressure medium from the pressure chamber 19 into the operating material sump 3 is blocked. The combined valve device 31 is used not only to close the operating material sump 3, but also to control the influencing pressure on the operating material sump 3. This exemplary embodiment of the present invention permits a particularly compact design having few elements. This function may, for example, be separated. However, this may require additional elements and additional outlay.

Figure 3:
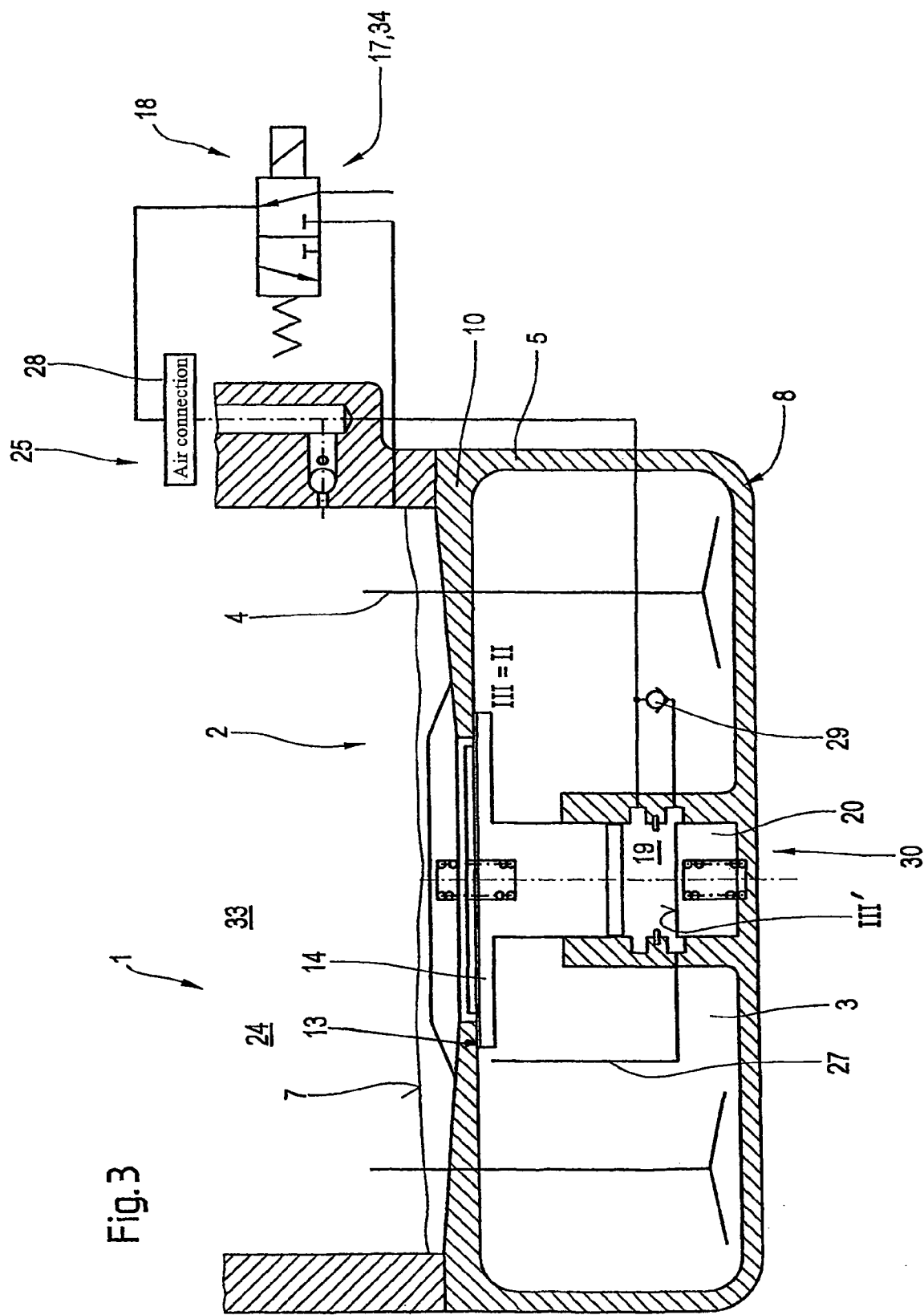
FIG. 3 illustrates an operating material supply device according to the present invention when being charged with pressure.

FIG. 3 illustrates the third functional state III of the valve element 14. FIG. 3 also illustrates functional state III' of the second piston element for releasing the connection between the pressure medium connection 28 and the atmosphere 25 and operating material sump 3. Since the operating material sump 3 is arranged below the conventionally arising operating material level, for example, the functioning material level 7 in the operating material reservoir 2, the operating material sump 3 remains filled with operating material. In this case, pressure medium flowing in, for example air flowing in via the pressure medium connection 28, immediately increases the operating material pressure in the operating material sump 3, without the dead volume in the operating material sump having to be sealed. The operating material pressure thus produced results in the operating material being transported out of the operating material sump 3 via the filling line 4 to the switching element. The remaining part of the operating material reservoir 2, for example, the region 24 partially filled with operating material, is outside the spatial dimensions of the operating material sump. After the filling operation is finished, the pressure medium connection 28, for example, the supply of air, is switched off, and the compressed air in the operating material sump 3 may escape via the nonreturn valve device 29 by way of the coupling to the rest of the interior, for example, into the vented part of the housing (e.g., region 24). The compressed air may then flow to the atmosphere, and the individual piston elements (i.e., the piston element 20 and piston element 15) may be displaced again into position I or I' for the unpressurized state. The operating material sump and the remaining region 24 of the operating material reservoir may be connected again. The leakage oil or operating material collected in the vented region 24 of the operating material reservoir may flow back into the operating material sump via the opening 11, which has been released. Another variant embodiment of the present invention directs the flowing back operating material into the operating material sump 3 via nonreturn valves.

An exemplary embodiment according to the present invention permits rapid filling of switching elements in gearing assemblies, starting units, retarder units or the like. In this case, the operating material required for the filling operation from an operating material sump of an operating material reservoir 2 is used, with the latter being placed under pressure for filling purposes. However, this presupposes that the operating material sump 3 may be closed in a pressure-tight manner with respect to the atmosphere or the rest of the interior of the operating material reservoir 2. Furthermore, a corresponding arrangement is required for supplying or producing an influencing pressure on the operating material sump, which has been closed in a pressure-tight manner. In this case, the two functions (i.e., pressure-tight closure of the operating material sump 3 and production or provision of an influencing pressure and charging of the operating material sump 3 with the latter) are performed by different devices. In another exemplary embodiment according to the present invention, a control valve device having corresponding line connections is used. This function is enabled, for example, the setting of the corresponding valve position, by the corresponding dimensioning of the forces acting on the valve piston elements 20 and 15 via the spring devices and by the pistons and the dimensioning thereof.

The invention claimed is:

1. An operating material supply device for a hydrodynamic component, the device comprising:
   a housing having an interior;
   an operating material reservoir arranged in the housing, the operating material reservoir including an operating material sump;
   a sealing arrangement configured to seal the operating material sump in a pressure-tight manner with respect to at least one of surroundings and the interior of the housing, the sealing arrangement includes a valve seat, at least one control valve having at least one first valve element to interact with the valve seat, a first actuating device coupled to the control valve to actuate the first valve element, a pressure medium connection coupled to the first actuating device and a movable piston element coupled to the first valve element, the valve seat forming the opening;
   a charging arrangement assigned to the operating material sump to charge the operating material sump with an influencing pressure, the charging arrangement being functionally and structurally coupled to the sealing arrangement, the charging arrangement and the sealing arrangement being at least partially combined into a single constructional unit, the charging arrangement includes a valve device having at least one second valve element and a second actuating device configured to charge the valve device to connect the operating material sump to the pressure medium connection, the pressure medium connection being connected to at least one of a pressure medium source and an atmosphere; and at least one filling line to connect the operating material sump to the hydrodynamic component.

2. The device of claim 1, wherein the hydrodynamic component includes a hydrodynamic switching element in one of a starter unit, a retarder unit, and a gearing assembly.

3. The device of claim 1, wherein the operating material sump includes housing walls and the operating material reservoir includes a lower region and a space outside the operating material sump, the operating material sump being arranged in the lower region of the operating material reservoir and delimited from remaining areas of the operating material reservoir by the housing walls, the operating material sump being connected to the space of the operating material reservoir via at least one opening.

4. The device of claim 1, wherein the operating material reservoir is arranged in the housing.

5. The device of claim 1, wherein the control valve of the sealing arrangement and the valve device of the charging arrangement form a combined valve device, and the first and second actuating devices are formed by a combined actuating device assigned to the first and second actuating devices.

6. The device of claim 5, wherein the combined valve device includes at least one pressure space and a second connection extending into the operating material sump, the first valve element of the control valve and the second valve element of the valve device being displaceably arranged in the pressure space.

7. The device of claim 6, further comprising spring devices to prestress the first and second valve elements of the control valve and the valve device, respectively, in a pressureless state of the pressure space, the spring devices and the first and second valve elements being dimensioned to permit an automatic charging of the operating material sump after the operating material sump is closed.

8. The device of claim 3, wherein the housing walls of the operating material sump are formed by a housing of the hydrodynamic component.

9. The device of claim 8, wherein the hydrodynamic component includes one of a starter unit, a retarder unit, and a gearing assembly.

10. The device of claim 1, wherein the device is used in a closed circuit of the hydrodynamic component.

11. The device of claim 1, wherein the device is used in a vehicle.

12. The device of claim 1, wherein the device is used in a stationary system.

* * * * *